(12) United States Patent
Bonanno

(10) Patent No.: US 11,060,619 B2
(45) Date of Patent: Jul. 13, 2021

(54) VALVE

(71) Applicant: CPT GROUP GmbH, Hannover (DE)

(72) Inventor: Rosario Bonanno, Bad Soden (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/471,883

(22) PCT Filed: Dec. 13, 2017

(86) PCT No.: PCT/EP2017/082715
§ 371 (c)(1),
(2) Date: Jun. 20, 2019

(87) PCT Pub. No.: WO2018/114547
PCT Pub. Date: Jun. 28, 2018

(65) Prior Publication Data
US 2019/0316687 A1    Oct. 17, 2019

(30) Foreign Application Priority Data

Dec. 22, 2016   (DE) ...................... 10 2016 226 127.4

(51) Int. Cl.
*F16K 1/46*      (2006.01)
*F16K 31/06*     (2006.01)
*F16K 39/02*     (2006.01)

(52) U.S. Cl.
CPC ............ *F16K 1/46* (2013.01); *F16K 31/0655* (2013.01); *F16K 31/0693* (2013.01); *F16K 39/024* (2013.01)

(58) Field of Classification Search
CPC ...... F16K 25/005; F16K 27/00; F16K 27/029; F16K 31/0655; F16K 31/0693; F16K 31/0686; F16K 39/024; F16J 15/3204; F02B 37/16; F02B 37/18; F02B 37/186; H01F 7/1607
USPC ................ 251/282, 367, 368; 277/353, 600
See application file for complete search history.

(56) References Cited

U.S. PATENT DOCUMENTS

| | | | | |
|---|---|---|---|---|
| 6,039,323 A * | 3/2000 | Mockenhaupt | ......... | F02F 7/006 277/593 |
| 6,375,157 B1 * | 4/2002 | Van de Lande | ...... | F16K 27/044 251/327 |
| 8,308,130 B2 * | 11/2012 | Vaz De Azevedo | ......... | F16K 31/0655 251/129.07 |

(Continued)

FOREIGN PATENT DOCUMENTS

| AU | 575 076 | 7/1998 |
|---|---|---|
| CN | 204628789 U | 9/2015 |

(Continued)

OTHER PUBLICATIONS

International Search Report issued in corresponding PCT application PCT/EP2017/082715.

(Continued)

*Primary Examiner* — Matthew W Jellett
(74) *Attorney, Agent, or Firm* — Cozen O'Connor

(57) ABSTRACT

A valve includes a housing, a solenoid arranged in the housing, a pin movable by the solenoid, a piston connected to the pin, and a seal. The piston is made of metal and the seal made of a different material than the piston. The seal is arranged in a crown region of the piston.

8 Claims, 4 Drawing Sheets

(56) References Cited

U.S. PATENT DOCUMENTS

| | | | |
|---|---|---|---|
| 2001/0002041 A1* | 5/2001 | Hayakawa | F16K 1/36 |
| | | | 251/129.15 |
| 2010/0089467 A1 | 4/2010 | Vernet | |
| 2015/0122352 A1 | 5/2015 | Matthews | |
| 2017/0261113 A1* | 9/2017 | Sato | B60T 8/363 |
| 2017/0292615 A1* | 10/2017 | Schmitz | F02B 37/16 |
| 2018/0003306 A1 | 1/2018 | Bonanno | |

FOREIGN PATENT DOCUMENTS

| | | |
|---|---|---|
| DE | 198 36 865 | 11/1999 |
| DE | 10 2007 002 432 | 6/2008 |
| DE | 10 2005 028 141 | 3/2013 |
| DE | 10 2014 113 540 | 2/2016 |
| DE | 10 2014 113 550 | 3/2016 |
| DE | 10 2014 226 885 | 6/2016 |
| DE | 10 2015 107 034 | 6/2016 |
| JP | H 02-5100 U | 1/1990 |
| JP | H 03-98377 U | 10/1991 |
| JP | 07-016144 Y | 4/1995 |
| JP | H11 230374 | 8/1999 |
| JP | 2012-102875 | 5/2012 |
| JP | 2013 083339 | 5/2013 |
| JP | 2018-502258 | 1/2018 |
| WO | WO 2015/066581 | 5/2015 |
| WO | WO 2016/041659 | 3/2016 |
| WO | WO 2016/102242 | 6/2016 |

OTHER PUBLICATIONS

Written Opinion issued in corresponding PCT application PCT/EP2017/082715.

German Office Action issued in the corresponding German Appln. No. 10 2016 226 127.4.

Office Action dated May 26, 2020 issued in Korean Patent Application No. 10-2019-7020645.

Office Action dated May 10, 2021 issued in Japanese Patent Application No. 2019-534386.

* cited by examiner

VALVE

CROSS REFERENCE TO RELATED APPLICATIONS

This is a U.S. national stage of International application No. PCT/EP2017/082715, filed on Dec. 13, 2017, which claims priority to German Application No. 10 2016 226 127.4, filed Dec. 22, 2016, the content of which are incorporated herein by reference.

BACKGROUND OF THE INVENTION

1. Field of the Invention

The invention relates to a valve of a type having a housing, a solenoid arranged in the housing, a pin movable by the solenoid, and a piston connected to the pin.

2. Description of the Prior Art

Such valves are used, inter alia, as a diverter valve on the turbocharger in motor vehicles to open up a bypass to the suction side in overrun operation, and are thus known. In order to prevent excessive deceleration of the turbocharger, but also to ensure a fast launch, fast opening and closing of the valve is essential. In particular during the closing process, the immediate closure as a result of the abutment of the piston against a valve seat is of importance. For reasons of weight, the piston is therefore formed from plastic. The valve seat is formed by the housing of the turbocharger, on which the valve is flange-mounted. Owing to the high number of closing cycles required over the service life and the operational temperature loads, high demands are placed on the component with regard to the plastic and the design of the piston, in particular in the region of the sealing edge. The costs for such a piston correspond to this. Furthermore, in individual cases, there is a decline in the sealing action over the service life.

SUMMARY OF THE INVENTION

It is therefore an object of the invention to provide a valve with an improved sealing function over the service life. Here, the valve should be inexpensive.

This object may be achieved, according to one aspect of the invention, if the piston is made of metal and has a seal composed of a different material than that of the piston, and wherein the seal is arranged in the crown region of the piston.

The formation of the piston from metal with the seal arranged in the crown region permits the separation of the function of sealing from the piston itself. This allows the seal to be configured in a manner directed exclusively to the sealing function, such that the sealing function is improved. At the same time, in this way, the piston can be of simpler design, whereby its production is inexpensive. The considerably reduced complexity of the piston, in particular in the crown region, permits the production of the piston by deep drawing. A metal piston also has the advantage of higher temperature resistance, such that the valve according to an aspect of the invention can cover a wider field of application, in particular at relatively high temperatures.

Greater resistance to aggressive media and thus a longer service life are realized if the piston is composed of high-grade steel, preferably a chromium-nickel steel.

Good media resistance is achieved in the case of the seal in that a rubber, preferably ethylene propylene diene monomer (EPDM), or a plastic, preferably polyphthalamide (PPA), is used as the sealing material. Both rubber and plastic are well suited for sealing against metallic valve seats. Furthermore, they can compensate for positional inaccuracies owing to tolerances or over the service life.

According to one advantageous refinement, the connection of the seal to the piston is particularly simple if the seal is of annular form and, on its side facing away from the sealing surface, has at least 3, preferably 4 to 12 and in particular 5 to 8, integral moldings which extend through apertures which are arranged in the crown of the piston.

Owing to the elasticity of the seal material, the integral moldings may have a slightly larger cross section than the apertures through which they pass during the installation of the seal. In this way, the seal can be connected to the piston and is nevertheless held securely on the piston.

According to another advantageous refinement, even more reliable protection against a detachment of the seal from the piston is achieved in that the integral moldings have, at their free end, a material accumulation which can be generated with the production of the seal, in particular injection molding or vulcanization, or by retroactive hot calking, wherein the material accumulation forms an undercut with respect to the respective aperture in the piston.

In another refinement, the seal can be arranged on the crown of the piston in that the piston has an inwardly directed flanged portion in the region of the crown, in that the seal bears against the flanged portion, in that a metal part which forms the crown of the piston bears against that side of the seal that is averted from the flanged portion, and in that the metal part is connected to the piston. The connection of the metal part to the piston may be performed independently of this, preferably by pressing or welding.

Depending on the sealing requirements and the installation location, the seal can be adapted in a targeted manner. This can be realized in a simple manner by the thickness of the seal body, wherein the seal body is to be understood as being that part of the seal arranged outside the piston. It has been found here that a thickness of 0.3 mm to 5 mm, preferably of 0.5 mm to 3 mm, is advantageous.

The connection of the piston to the pin may be realized either by welding or riveting. Both types of connection have the advantage that the piston can be connected directly and thus without an additional component to the pin, which is likewise composed of metal. This is in contrast to a plastics piston, the connection of which to the pin requires an additional connecting part.

Owing to the greater stability of metal in relation to plastic, the wall thickness of the piston can be made significantly smaller. Depending on the field of use, it has proven to be advantageous if the metal of the piston has a thickness of 0.3 mm to 0.8 mm, preferably of 0.4 mm to 0.6 mm and in particular of 0.5 mm. Here, the smaller wall thickness of a metal piston in relation to a piston composed of plastic compensates for the higher density of metal in relation to plastic, such that the weight of the valve is not significantly affected.

BRIEF DESCRIPTION OF THE DRAWINGS

The invention will be described in more detail on the basis of an exemplary embodiment. In the figures.

DETAILED DESCRIPTION OF THE PRESENTLY PREFERRED EMBODIMENTS

Figure 1:
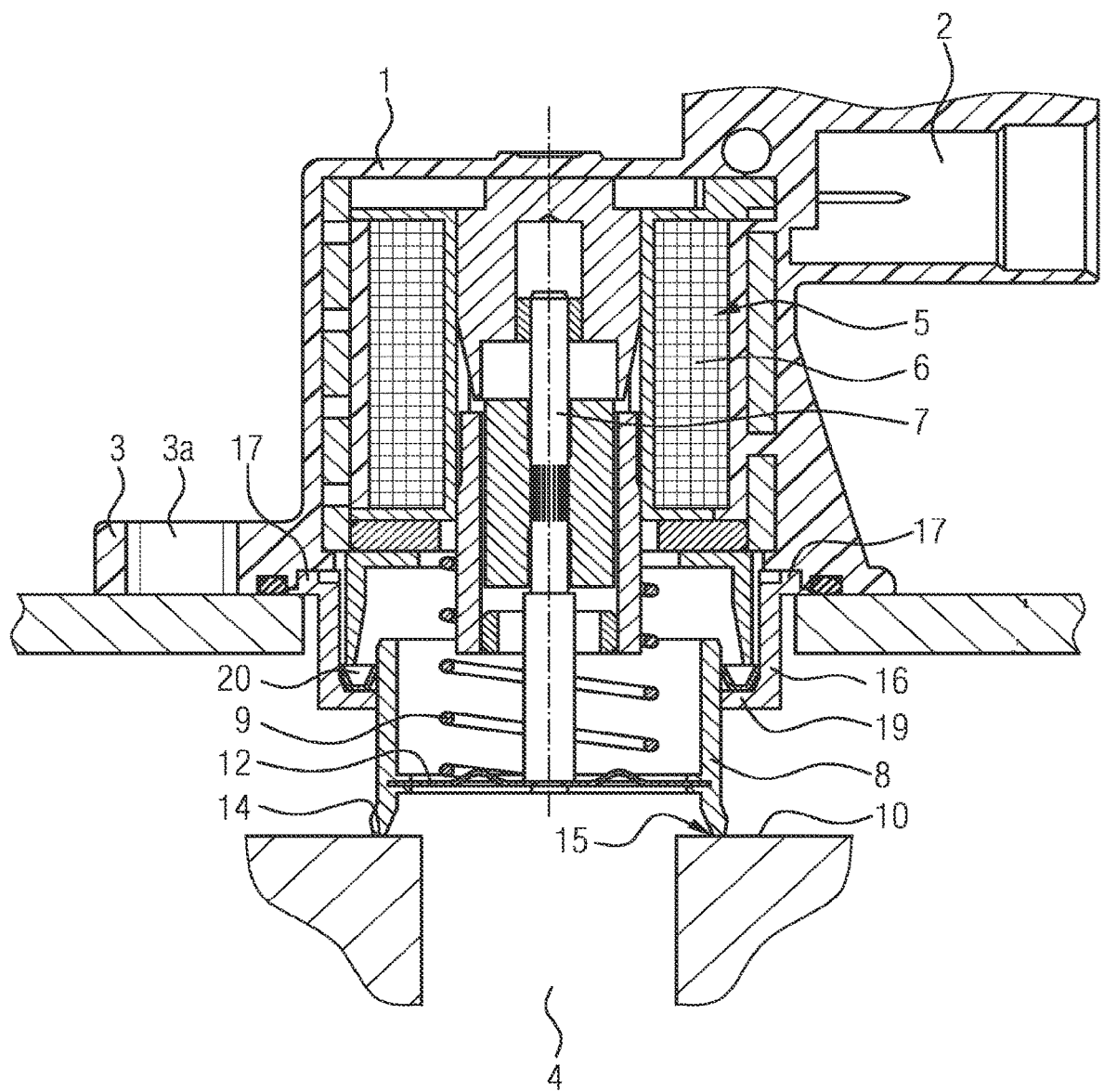
FIG. 1 shows a sectional illustration of the valve according to the prior art.

FIG. 1 shows the valve comprising a housing 1 with integrally molded socket 2 for the electrical connection of the valve. The housing 1 furthermore has an integrally formed flange 3 and three bores 3a, by which the housing 1 is flange-mounted on a turbocharger (not illustrated) in the region of the bypass line 4. In the housing 1, there is arranged a solenoid 5 with a coil 6 and a metal pin 7. The metal pin 7 is connected to a pot-shaped piston 8. A spring 9 preloads the piston 8, in the non-actuated state of the solenoid 5, against a valve seat 10 in order to close off the bypass line 4, such that no medium can flow out of and from the bypass line 4 into the line 11. Here, the spring 9 is supported on the solenoid 5 and on the piston 8, wherein the piston 8 has, in its crown 12, a concentric bead 13 (see FIGS. 2 and 3) for centering the spring 9. The piston 8 has a wall thickness of 0.5 mm. On the outer side of the crown 12, there is arranged an axially protruding annular seal 14 composed of PPA. In the closed position shown, the sealing surface 15 bears against the valve seat 10. The housing 1 is connected to a protective sleeve 16, composed of plastic, by a detent connection 17. In the region of the detent connection 17, a seal 20 is also arranged in the housing 1, by which seal the housing 1 is sealed off against the turbocharger. The protective sleeve 16 is a substantially cylindrical component which, on the side facing away from the detent connection 17, has a radially inwardly pointing collar 19. On the collar 19, there is seated a radially encircling seal 20 with a V-shaped cross-section. A socket extending from the solenoid 5 in the direction of the piston 8 and formed integrally with the housing 1 holds the seal 20 on the collar 19 in its position.

Figure 2:
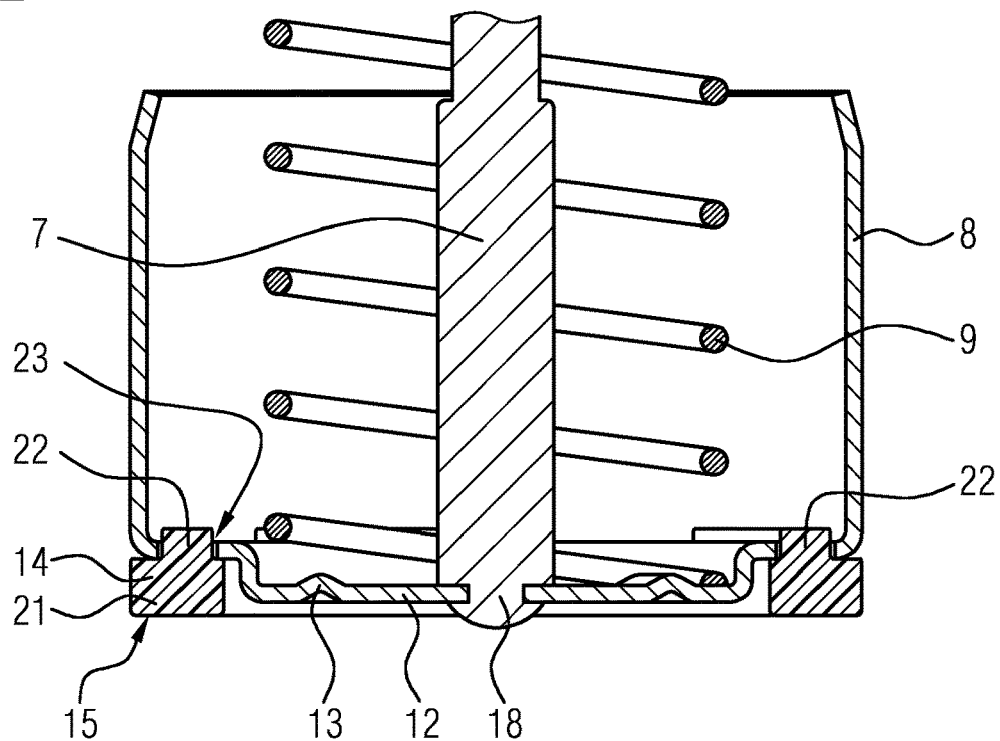
FIG. 2 shows an enlarged sectional illustration of the piston of a valve according to the invention.

FIG. 2 shows the piston 8 composed of a chromium-nickel steel, which be connected by a rivet connection 18 with its crown 12 and its cylindrical lateral surface. In the interior of the piston 8, the spring 9 is shown, which is centered by the bead 13. In the region of the seal 14, the crown 12 is recessed in the direction of the housing. This avoids the need for additional structural space for the axially projecting seal 14. The seal 14 is composed of a sealing body 21 with the sealing surface 15. The sealing body has integral moldings 22 distributed uniformly over the circumference. The integral moldings 22 have a cylindrical shape and project through apertures 23 in the crown 12 of the piston 8. The integral moldings 22 can be plastically deformed by hot calking such that material accumulations with a greater diameter than the apertures 23 are formed. In this way, the seal 14 is held securely on the piston 8.

Figure 3:
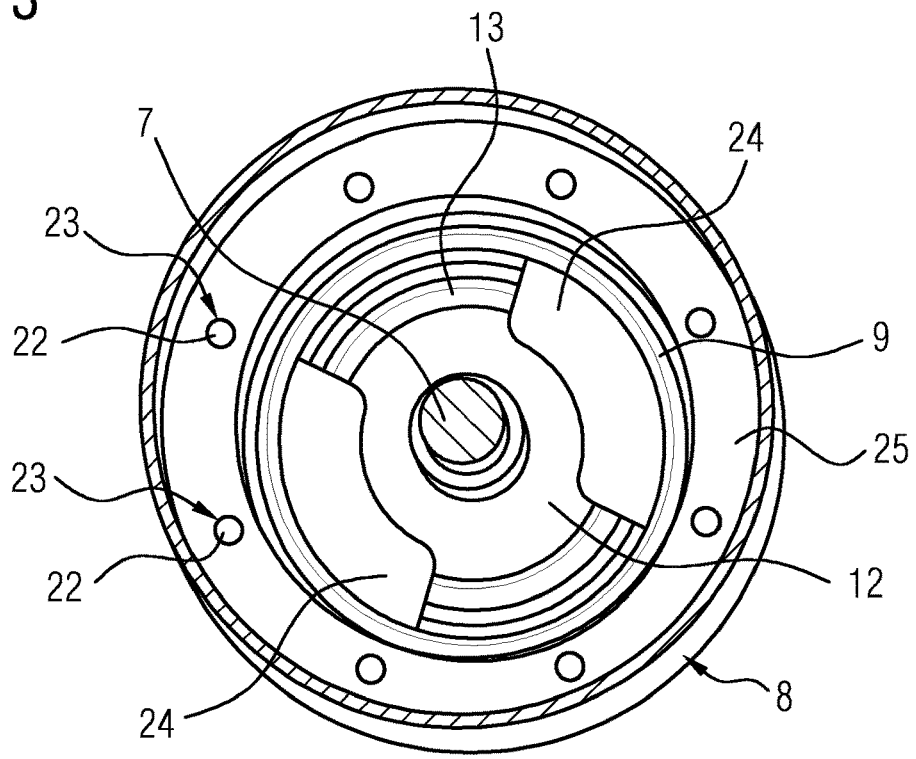
FIG. 3 shows a plan view into the piston.

FIG. 3 shows the piston 8 from the perspective of the housing, with the spring 9, the bead 13 for centering the spring 9 and the metal pin 7. Two openings 24 in the crown 12 of the piston 8 permit a pressure equalization between the interior of the piston 8 and the bypass line 4, whereby the opening of the valve is facilitated. In the radially encircling shoulder 25, there are arranged eight uniformly distributed apertures 23, through which in each case one integral molding 22 of the seal 14 projects into the interior of the piston 8.

Figure 4:
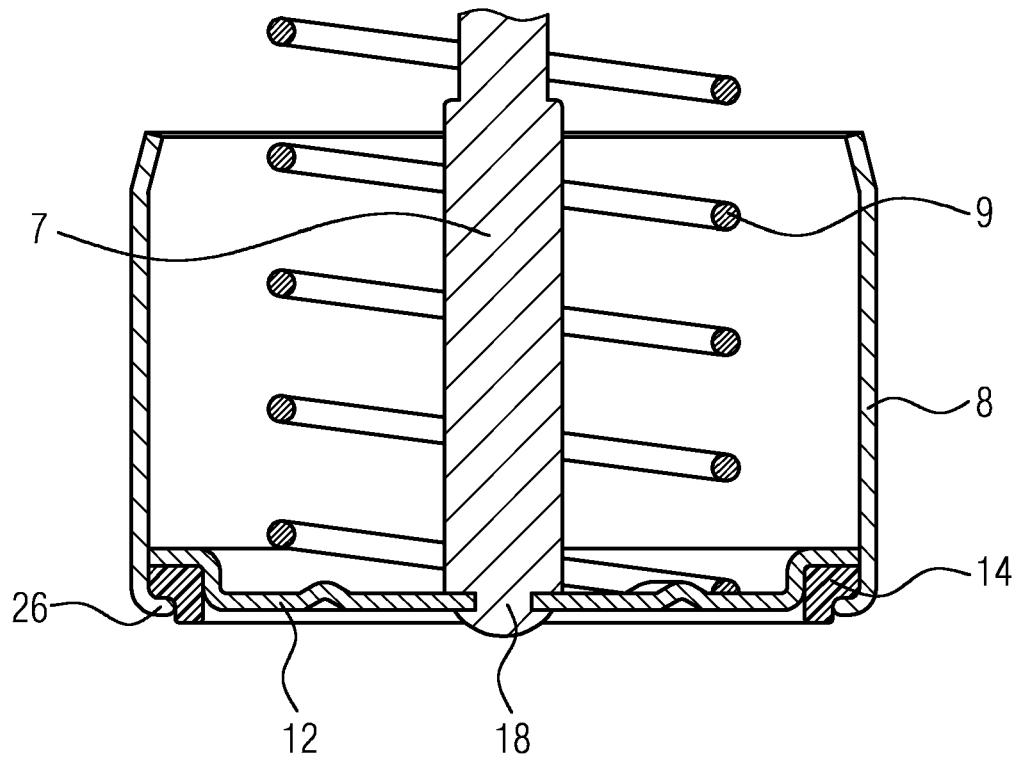
FIG. 4 shows the piston in section.

FIG. 4 shows the piston 8 with a metal part as a separate crown 12 and with the seal 14. The piston 8 has a substantially cylindrical shape with an inwardly directed flanged portion 26. The seal 14 lies on this flanged portion. The crown 12 is set down on the seal 14 and welded to the piston 8, whereby the seal 14 is clamped between crown 12 and piston 8 and thus fixed in its position.

Figure 5:
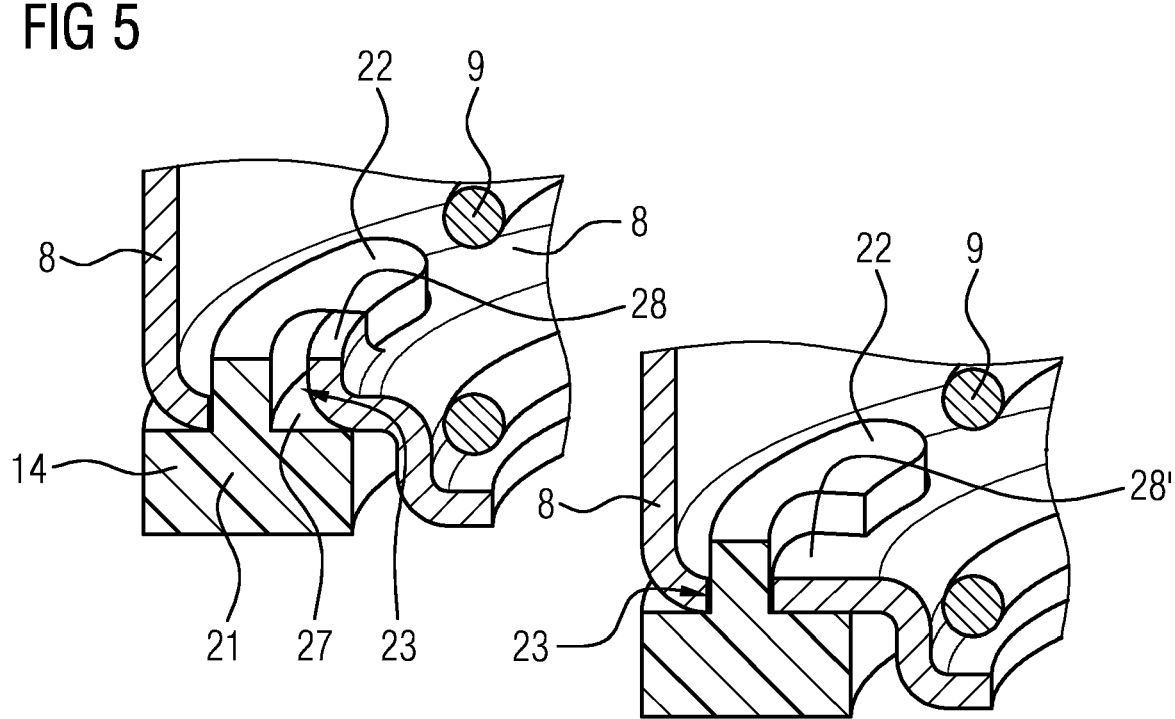
FIGS. 5 and 6 show the seal connection to the piston.

FIG. 5 shows the seal 14 with the main body 21 and the integral moldings 22, which have a recess 27. A tab 28 on the crown 12 is firstly bent in the direction of the housing in order to allow insertion of the seal 14. The tab 28' is subsequently bent over, wherein it engages into the recess 27 and thus fixes the seal 14.

Figure 6:
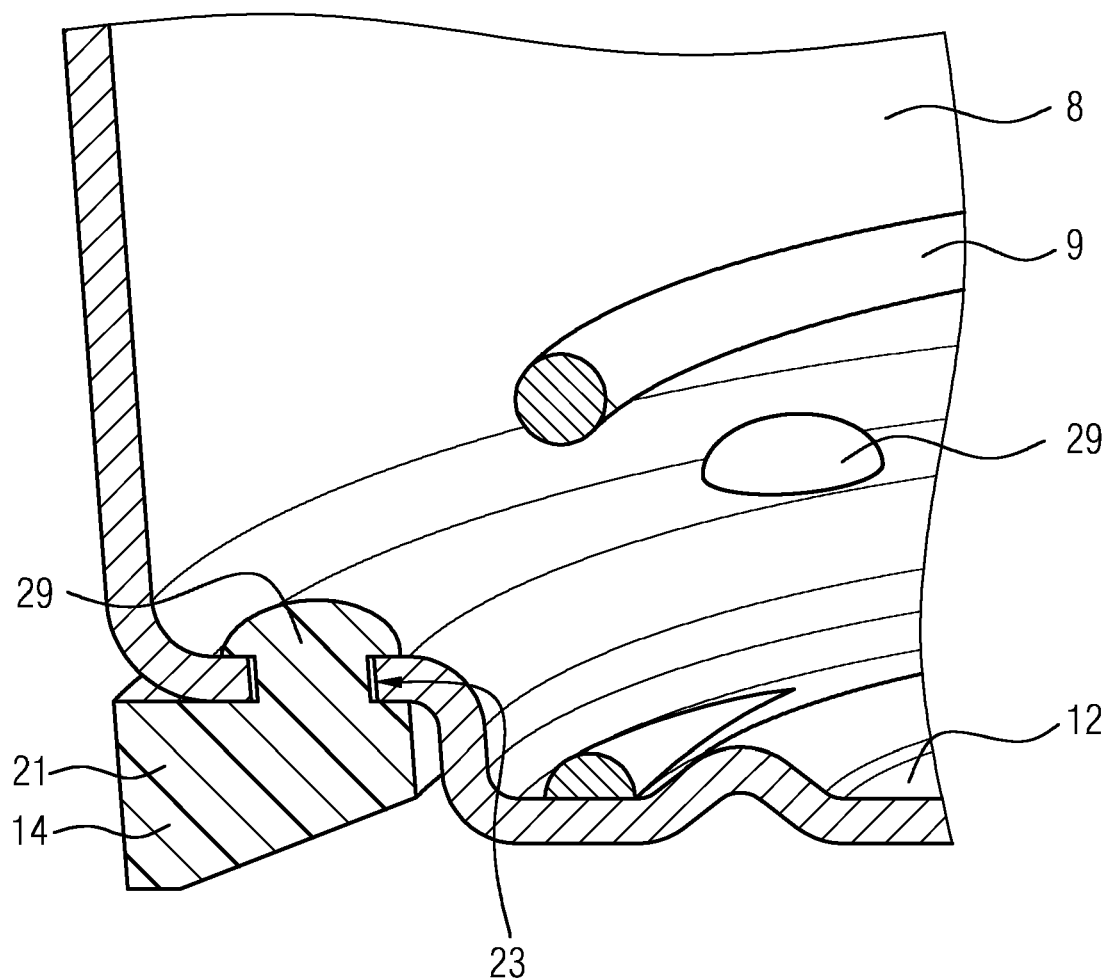

FIG. 6 shows the fastening of the seal 14 by hot calking, wherein a material accumulation 29 of the integral moldings 22 is generated such that the diameter is greater than the respective aperture 23.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
a housing (1);
a solenoid (5) arranged in the housing (1);
a pin (7) movable by the solenoid (5);
a piston (8) connected to the pin (7), the piston (8) having a crown region including a crown (12); and
a seal (14) arranged in the crown region of the piston (8), the seal (14) having a sealing surface (15),
wherein the piston (8) is made of metal and the seal (14) is made of a different material than the piston (8),
wherein the seal (14) is of annular form and, on its side facing away from the sealing surface (15), has 3 to 12 integral moldings (22), each of which extends through a respective one of plural apertures (23) arranged in the crown (12) of the piston (8), and
wherein the seal (14) includes a main body (21) and the integral moldings (22), the integral moldings each have a recess (27), and the crown (12) has plural tabs (28), each of which is configured to be bent in a first direction, to allow insertion of the seal (14), and then be bent in a second direction to engage a respective one of the recesses (27) of the inserted seal (14).

2. The valve as claimed in claim 1, wherein the piston (8) is made of high-grade steel.

3. The valve as claimed in claim 1, wherein the seal (14) comprises an Ethylene Propylene Diene Monomer (EPDM) rubber, or a Polyphthalamide (PPA) plastic.

4. A valve comprising:
a housing (1);
a solenoid (5) arranged in the housing (1);
a pin (7) movable by the solenoid (5);

a piston (8) connected to the pin (7), the piston (8) having a crown region including a crown (12); and a seal (14) arranged in the crown region of the piston (8), the seal (14) having a sealing surface (15), wherein the piston (8) is made of metal and the seal (14) is made of a different material than the piston (8), wherein the seal (14) comprises an Ethylene Propylene Diene Monomer (EPDM) rubber, or a Polyphthalamide (PPA) plastic, wherein the seal (14) is of annular form and, on its side facing away from the sealing surface (15), has 3 to 12 integral moldings (22), each of which extends through a respective one of plural apertures (23) arranged in the crown (12) of the piston (8), and wherein the integral moldings (22) have, at their free end, a material accumulation (29) forming an undercut with respect to the respective apertures (23), the material accumulation (29) being generatable during production of the seal (14) or by retroactive hot calking.

5. The valve as claimed in claim 1, wherein the main body (21) has a thickness of at least one selected from the group of: 0.5 mm to 10 mm and 1 mm to 5 mm.

6. The valve as claimed in claim 1, wherein the piston (8) is welded to the crown (12).

7. The valve as claimed in claim 1, wherein the metal of the piston (8) has a thickness of at least one selected from the group of: 0.3 mm to 0.8 mm, 0.4 mm to 0.6 mm and 0.5 mm.

8. The valve as claimed in claim 2, wherein the high-grade steel is a chromium-nickel steel.

\* \* \* \* \*